United States Patent
Waldspurger et al.

(10) Patent No.: US 11,816,498 B2
(45) Date of Patent: Nov. 14, 2023

(54) EARLY EVENT-BASED NOTIFICATION FOR VM SWAPPING

(71) Applicant: Nutanix, Inc., San Jose, CA (US)

(72) Inventors: Carl Alan Waldspurger, Palo Alto, CA (US); Florian Anselm Johannes Schmidt, Cambridge (GB); Jonathan James Davies, Cambridge (GB)

(73) Assignee: Nutanix, Inc., San Jose, CA (US)

( * ) Notice: Subject to any disclaimer, the term of this patent is extended or adjusted under 35 U.S.C. 154(b) by 304 days.

(21) Appl. No.: 17/154,457

(22) Filed: Jan. 21, 2021

(65) Prior Publication Data
US 2022/0229684 A1    Jul. 21, 2022

(51) Int. Cl.
*G06F 9/455* (2018.01)
*G06F 9/54* (2006.01)
*G06F 13/16* (2006.01)

(52) U.S. Cl.
CPC .......... *G06F 9/45558* (2013.01); *G06F 9/542* (2013.01); *G06F 13/1668* (2013.01); *G06F 2009/4557* (2013.01); *G06F 2009/45579* (2013.01); *G06F 2009/45583* (2013.01)

(58) Field of Classification Search
CPC .. G06F 9/45558; G06F 9/542; G06F 13/1668; G06F 2009/4557; G06F 9/5077; G06F 9/545; G06F 2009/45579; G06F 2009/45583
See application file for complete search history.

(56) References Cited

U.S. PATENT DOCUMENTS

| | | | |
|---|---|---|---|
| 8,549,518 B1 | 10/2013 | Aron et al. | |
| 8,850,130 B1 | 9/2014 | Aron et al. | |
| 2005/0108444 A1* | 5/2005 | Flauaus | H04L 43/00 710/15 |
| 2009/0049337 A1* | 2/2009 | Hsieh | G06F 1/263 713/340 |
| 2009/0144483 A1* | 6/2009 | Sakurai | G06F 9/45558 718/1 |
| 2009/0172330 A1* | 7/2009 | Dewan | G06F 12/145 711/E12.001 |
| 2012/0131380 A1* | 5/2012 | Horman | G06F 11/1415 711/170 |
| 2012/0254893 A1* | 10/2012 | Pope | G06F 9/48 719/318 |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Tuan C Dao
(74) *Attorney, Agent, or Firm* — Foley & Lardner LLP

(57) ABSTRACT

Various embodiments disclosed herein are related to a non-transitory computer readable storage medium. In some embodiments, the medium includes instructions stored thereon that, when executed by a processor, cause the processor to receive, from a user-space application, a request to detect swapping activity satisfying a threshold condition, detect the swapping activity satisfying the threshold condition, and, in response to occurrence of the threshold condition, send a response that indicates that the swapping activity satisfies the threshold condition.

20 Claims, 3 Drawing Sheets

(56) References Cited

U.S. PATENT DOCUMENTS

| | | | | |
|---|---|---|---|---|
| 2013/0007379 | A1* | 1/2013 | Kegel | G06F 21/78 |
| | | | | 711/E12.001 |
| 2013/0196765 | A1* | 8/2013 | Wolff-Petersen | ............................ |
| | | | | A63F 13/5375 |
| | | | | 463/36 |
| 2013/0232573 | A1* | 9/2013 | Saidi | H04W 12/37 |
| | | | | 726/22 |
| 2014/0143474 | A1* | 5/2014 | Damle | G06F 12/0246 |
| | | | | 711/103 |
| 2015/0026807 | A1* | 1/2015 | Lutas | G06F 21/54 |
| | | | | 711/6 |
| 2015/0324119 | A1* | 11/2015 | Romanovsky | G06F 3/061 |
| | | | | 711/103 |
| 2016/0048464 | A1* | 2/2016 | Nakajima | G06F 9/5016 |
| | | | | 711/152 |
| 2017/0054658 | A1* | 2/2017 | Min | G06F 9/54 |
| 2017/0329655 | A1* | 11/2017 | Yuan | G06F 9/485 |
| 2018/0024867 | A1* | 1/2018 | Gilsdorf | G06F 1/183 |
| | | | | 709/226 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

* cited by examiner

EARLY EVENT-BASED NOTIFICATION FOR VM SWAPPING

BACKGROUND

Hypervisors and operating systems may implement demand paging to support virtual memory. In some embodiments, virtual memory provides an illusion of more random-access memory (RAM) than is physically available.

SUMMARY

Various embodiments disclosed herein are related to a non-transitory computer readable storage medium. In some embodiments, the medium includes instructions stored thereon that, when executed by a processor, cause the processor to receive, from a user-space application, a request to detect swapping activity satisfying a threshold condition, detect the swapping activity satisfying the threshold condition, and, in response to occurrence of the threshold condition, send a response that indicates that the swapping activity satisfies the threshold condition.

Various embodiments disclosed herein are related to an apparatus. In some embodiments, the apparatus includes a processor and a memory. In some embodiments, the memory includes programmed instructions that, when executed by the processor, cause the apparatus to receive, from a user-space application, a request to detect swapping activity satisfying a threshold condition, detect the swapping activity satisfying the threshold condition, and, in response to occurrence of the threshold condition, send a response that indicates that the swapping activity satisfies the threshold condition.

Various embodiments disclosed herein are related to a method. In some embodiments, the method includes receiving, from a user-space application, a request to detect swapping activity satisfying a threshold condition, detecting the swapping activity satisfying the threshold condition, and, in response to occurrence of the threshold condition, sending a response that indicates that the swapping activity satisfies the threshold condition.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
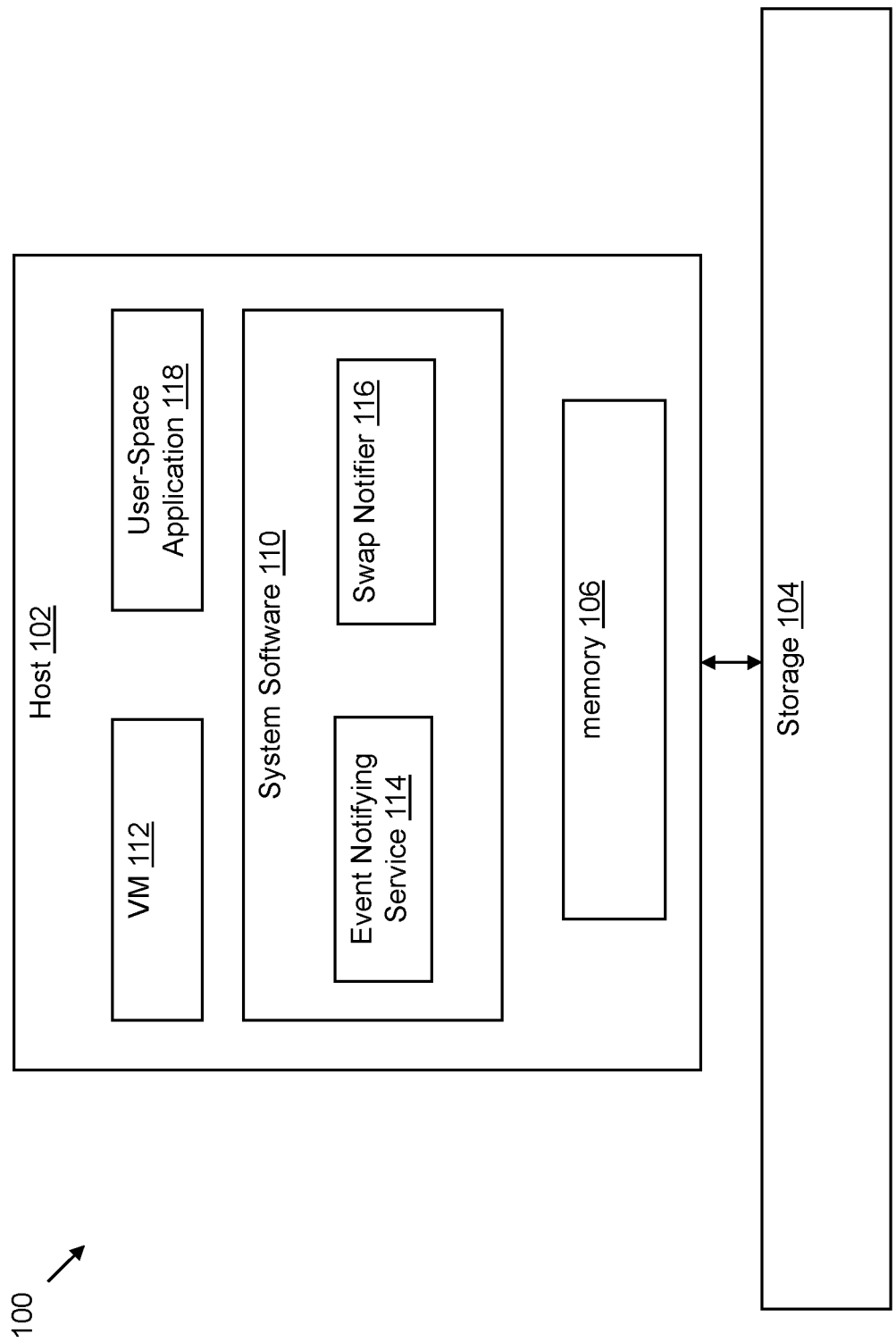
FIG. 1 is an example block diagram of a virtual environment for early event-based notification of VM swapping, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Hypervisors and operating systems may implement demand paging to support virtual memory. In some embodiments, virtual memory provides an illusion of more random-access memory (RAM) than is physically available. When memory is overcommitted, the operating system may reclaim pages resident in RAM, swapping out the contents of the RAM to a slower backing store (e.g., disk storage, local non-volatile memory (NVM), NVM accessed across a network, or remote RAM accessed across a network), from which the contents can later be read on demand if needed.

In some embodiments, system software (e.g., host operating system, kernel, and/or a hypervisor), exports various statistics about swapping via nodes in files (e.g., pseudo files, procfs file system or sysfs file system of Linux). The files may enable user-mode applications to obtain information about swapping by reading these nodes. In some embodiments not disclosed herein, the system software uses a polling approach. Polling includes repeatedly reading the current statistics in a loop and monitoring for relevant changes in the values of the exported statistics. Polling has several significant disadvantages. Active polling may consume central processing unit (CPU) time, even if short delays are used between reads to reduce the overhead of continuous polling. The system software may repeatedly schedule and de-schedule the application performing the polling, which may incur both direct (e.g. CPU consumption) and indirect (e.g. cache interference) overheads. Moreover, as a result of introducing delays to reduce the overhead of polling, the polling application may not notice changes to swap statistics immediately. Such notification delays may give the application less time to react to important changes. For example, an application may monitor swap statistics in order to quickly update per-VM memory allocations, such as reallocating memory from VMs with excess memory to VMs that are swapping due to memory pressure. Incurring delays due to polling may cause such reallocations to occur too late to prevent significant performance degradation. What is desired is an event-based notification mechanism that allows user-mode applications to efficiently wait for asynchronous notifications of relevant swapping events.

Disclosed herein are embodiments for efficient user-space monitoring for host-level swapping of memory pages from virtual machines (VMs), such as memory-overcommitted VMs in system software (e.g., a virtualization system, such as a hypervisor, which may be based on Linux kernel virtual machine (KVM)). Some embodiments interpose on swapping activity in order to notice changes satisfying a threshold by providing event-based notifications to user-mode applications. In some embodiments, the system software receives a request from a user application to detect swapping activity satisfying the threshold condition, detects the swapping activity, and, in response, notifies the user application.

Advantageously, in some embodiments disclosed herein, the system software does not have to repeatedly schedule and de-schedule polling requests. Thus, some embodiments incur less CPU consumption and cache interference. Furthermore, notification delays need not be incurred to improve resource consumption. Accordingly, user applications may be notified immediately of swapping activity, giving the application more time to react to changes.

FIG. 1 illustrates a block diagram of a virtual environment 100 environment for early event-based notification of VM swapping, in accordance with some embodiments. The virtual environment 100 includes a host (e.g., node, machine, computer) 102 and a storage (e.g., swap space) 104 coupled to the host 102. In some embodiments, the host 102 includes underlying hardware such as memory 106, one or more physical disks, one or more input/output (I/O) devices, and one or more central processing units (CPUs). In some embodiments, the host 102 includes system software (a bare-metal hypervisor, a hosted/kernel-based hypervisor, a host operating system such as Linux, a kernel, or a combination thereof) 110, and a virtual machine (VM) (e.g., guest VM) 112. In some embodiments, the host 102 includes a host operating system (OS) separate from the system software 110. In some embodiments, the memory 106 includes metadata such as one or more of a page table or a logical block address (LBA)-to-physical block address (PBA) mapping table.

In some embodiments, the host 102 includes a user-space application 118 (e.g., an application that runs in unprivileged user mode). The user-space application 118 may be a host-level component (e.g., separate from the VM 112). In some embodiments, the user-space application 118 is in communication with the system software 110.

The memory 106 may store contents (e.g., data) of non-swapped pages. The storage 104 may store contents of swapped pages. The system software 110 may enable use of a kernel-based hypervisor and/or other loadable kernels. The system software 110 may virtualize the underlying resources for virtual machines such as the VM 112. In some embodiments, each page table entry (PTE) of the page table that corresponds to a guest physical page in the memory 106 (e.g., non-swapped guest physical page) specifies a physical address (e.g., in the memory 106) for the non-swapped guest physical page. In some embodiments, each page entry of the page table that corresponds to a guest physical page in the storage 104 (e.g., a swapped guest physical page) specifies a swap location (e.g., in the storage 104).

In some embodiments, the system software 110 includes an event notifying service 114 and a swap notifier 116. In some embodiments, the event notifying service 114 registers its own swap notifier 116 (e.g., implemented as a Linux frontswap backend or other system software module that can interpose on swap operations) in the kernel. In some embodiments, the swap notifier 116 employs the frontswap interface only to observe swap activity. In some embodiments, the swap notifier 116 interposes on swap activity, detects swapping activity and indicates to the event notifying service 114 that the swap notifier 116 detects swapping activity. In some embodiments, in response to receiving the indication from the swap notifier 116, the event notifying service 114 notifies the user-space application 118. In some embodiments the event notifying service 114 is a same component as the swap notifier 116.

In some embodiments, the swap notifier 116 is automatically inserted in (e.g., at a head of, early in) the swap-out path, so that it interposes on all swap-out activity and detects swap activity. In some embodiments, the swap notifier 116 caches pages and interposes on evictions from caches. In some embodiments, the swap notifier 116 is implemented as a loadable kernel module. In some embodiments, the swap notifier 116 can similarly monitor swap-in activity. Some embodiments detect swap activity at other points in the swap-in and swap-out paths, such as by interposing on the actual I/O requests to the storage 104 (e.g. disk reads and writes) and detecting the swap activity. Some embodiments detect swap activity during an update of the page table. In some embodiments, the event notifying service 114, or the like, can interpose on guest page-tables, e.g., write-protect the page tables, and trap to the hypervisor on writes. Some embodiments detect swap activity by interposing on inter-processor interrupts used to perform translation lookaside buffer (TLB) shootdowns when page-table entries are modified. Some embodiments detect swap activity during a translation of an LBA to a PBA.

In some embodiments, the event notifying service 114 may be in communication with multiple swap notifiers 116(1)-116(M), where M is an integer. For example, a swap notifier 116(1) can be in the kernel, a swap notifier 116(2) can be interposing on the storage I/O requests, a swap notifier 116(3) can monitor page-table writes, and/or a swap notifier 116(4) can monitor TLB shootdown IPIs. In some embodiments, the event notifying service 114 may select one of the multiple swap notifiers 116(1)-116(M). In some embodiments, the event notifying service 114 may update its selection of one of the multiple swap notifiers 116(1)-116(M).

In some embodiments, the user-space application 118 indicates (e.g., requests, registers its interest in), to the event notifying service 114, being notified about changes in swap statistics by the event notifying service 114, allowing the user-space application 118 to wait efficiently by issuing a blocking system call, from which the user-space application 118 is awakened automatically by a notification from the event notifying service 114. In some implementations, the event notifying service 114 uses sysfs_notify( ) to awaken the (e.g., user-space) application process waiting on a sysfs node. In some embodiments, a sysfs node is a node of a file system provided by the system software 110 that exports information about various subsystems, hardware devices, and associated device drivers of the host operating system. In some embodiments, the event notifying service 114 uses eventfd notification mechanism to awaken the application process waiting on a sysfs node.

The desired conditions used to trigger notifications can be communicated to the frontswap backend in various ways, e.g. by writing to a sysfs node, or issuing an ioctl( ) to a special file. The triggering conditions can be expressed as thresholds in terms of swap statistics associated with one or more individual VMs, processes, or a collection of processes that are bound by a common criterion and associated with a set of parameters or limits (e.g., control groups, cgroups). In some embodiments, the swap notifier 116 maintains a state, such as various counters per cgroup/process, and updates the state as the swap notifier 116 interposes on swapped pages, in order to determine when a threshold is crossed. Such conditions may be numeric thresholds on raw swap counts or more complex Boolean expressions over derived metrics. For example, triggers may be based on conditions associated with multiple VMs. In some embodiments, the triggers may include metrics such as means, standard deviations, or moving averages such as exponentially weighted moving averages (EWMAs).

The memory 106 may include, but is not limited to (a) temporary memory device such as random access memory (RAM) or (b) non-volatile memory (NVM, e.g., persistent memory) such as non-volatile dual in-line memory modules (NVDIMM), read only memory (ROM) device, any type of magnetic storage devices (e.g., hard disk, floppy disk, magnetic strips, etc.), optical disks (e.g., compact disk (CD), digital versatile disk (DVD), etc.), smart cards, solid state devices, etc.

The storage 104 may include, but is not limited to, NVM such as NVDIMM, storage devices, optical disks, smart cards, solid state devices, etc. The storage 104 can be shared with one or more host machines such as the host 102. The storage 104 can store data associated with the host 102. The data can include file systems, databases, computer programs, applications, etc. The storage 104 can also include the swapped out data from the memory 106 of the host 102. In some embodiments, the storage 104 may include swapped out memory data from the host 102 and metadata that includes information regarding the locations of the swapped-out memory data on the storage 104. In some such embodiments, the storage 104 can be partition of a larger storage device or pool. In some embodiments, the storage 104 is a network-attached-storage such as a storage array network (SAN).

Each of the components (e.g., elements, entities) of the virtual environment 100 (e.g., the host 102, the system software 110, the memory 106, the VM 112, the event notifying service 114, and the storage 104), is implemented using hardware, software, or a combination of hardware or software, in one or more embodiments. One or more of the components of the virtual environment 100 may include a processor with instructions or may be an apparatus/device (e.g., server) including a processor with instructions, in some embodiments. In some embodiments, multiple components may be part of a same apparatus and/or share a same processor. Each of the components of the virtual environment 100 can include any application, program, library, script, task, service, process or any type and form of executable instructions executed by one or more processors, in one or more embodiments. Each of the one or more processors is hardware, in some embodiments. The instructions may be stored on one or more computer readable and/or executable storage media including non-transitory storage media.

Figure 2:
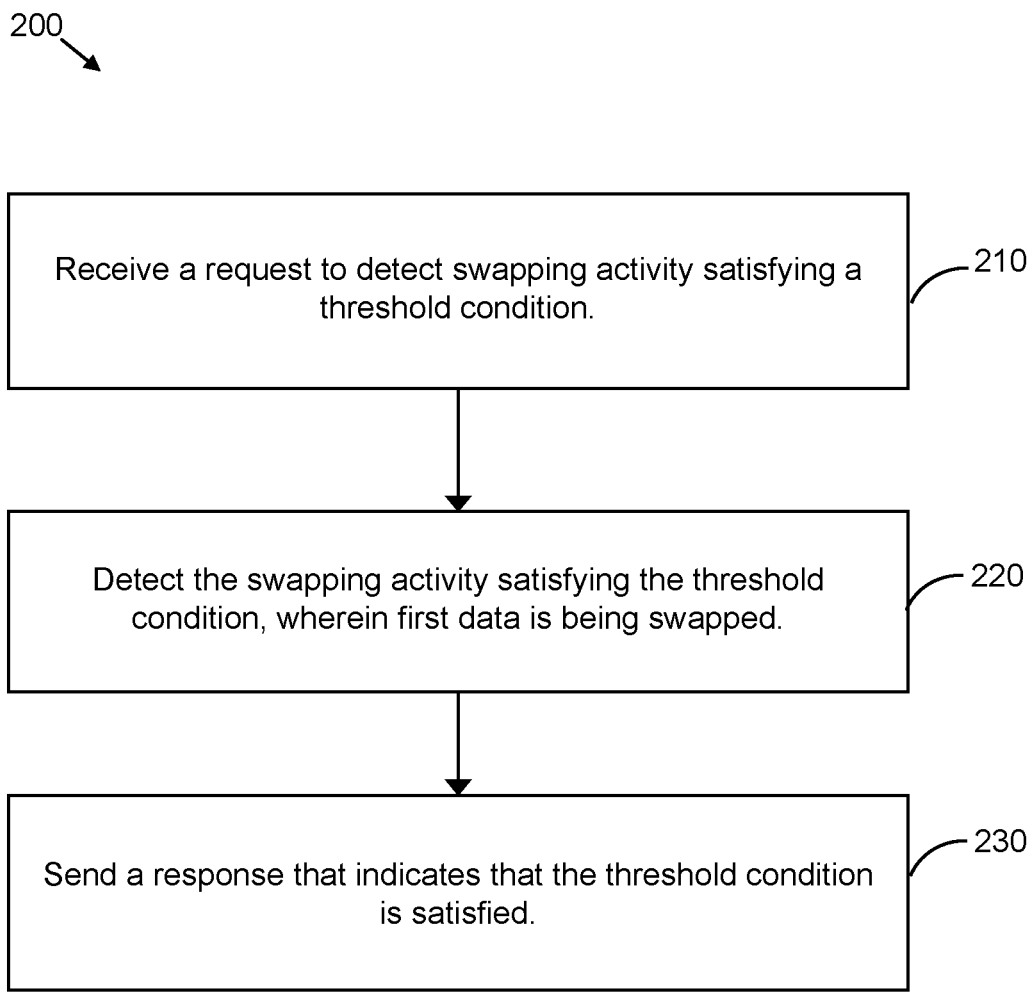
FIG. 2 is an example flowchart of a method, in accordance with some embodiments of the present disclosure.

Referring now to FIG. 2, a flowchart of an example method 200 is illustrated, in accordance with some embodiments of the present disclosure. The method 200 may be implemented using, or performed by, the virtual environment 100, one or more components of the virtual environment 100 (e.g., the host 102, the system software 110) a processor associated with the virtual environment 100, or a processor of the one or more components of the virtual environment 100. Additional, fewer, or different operations may be performed in the method 200 depending on the embodiment.

A processor (e.g., the host 102, the system software 110, or a combination thereof) receives, from a user-space application, a request to detect swapping activity satisfying (e.g., exceeding) a threshold condition (at operation 210). In some embodiments, the threshold condition can include swap statistics associated with one or more individual VMs, processes, or a collection of processes. In some embodiments, threshold condition can include one or more of numeric thresholds on raw swap counts or Boolean expressions over derived metrics. In some embodiments, the metrics can include one or more of means, standard deviations, moving averages, or EWMAs.

The processor detects the swapping activity satisfying the threshold condition (at operation 220). In some embodiments, the swapping activity includes first data being swapped out from memory to storage. The processor sends a response, to the user-space application, indicating that the swapping activity satisfies the threshold condition (at operation 230).

Figure 3:
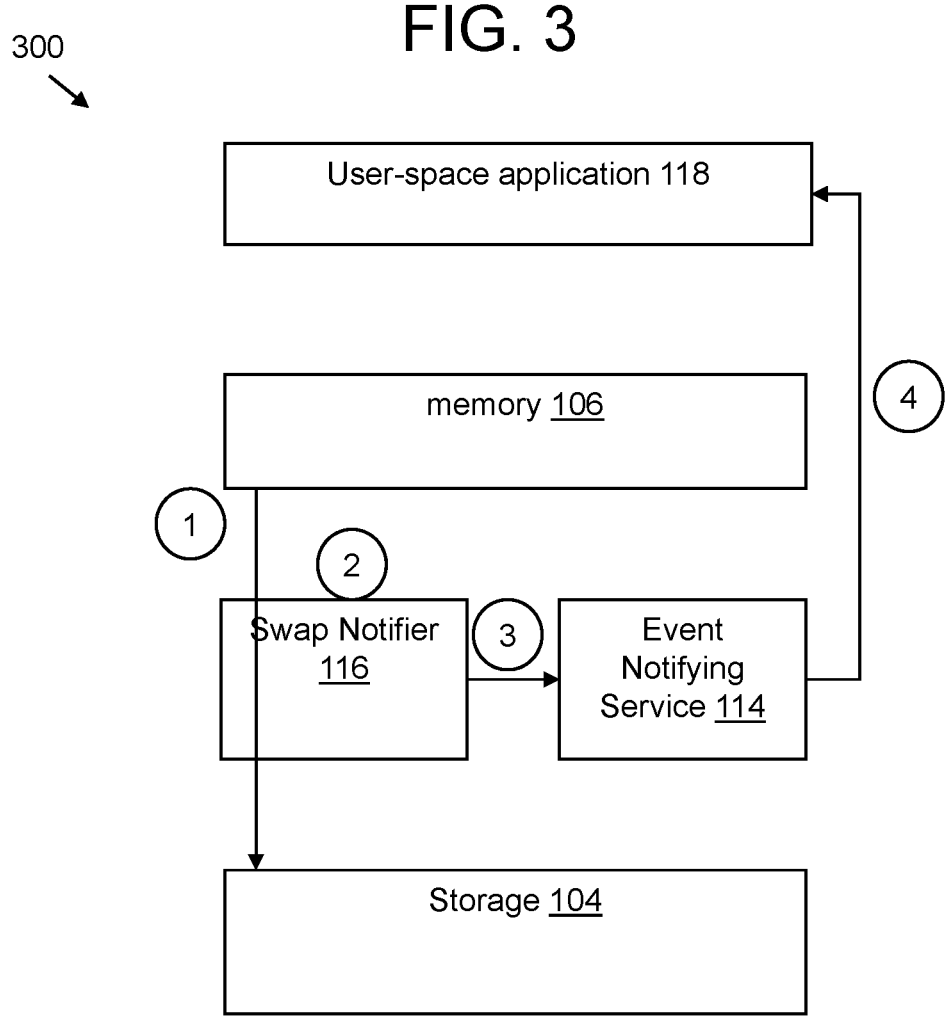
FIG. 3 is a diagram illustrating notification of swap activity, in accordance with some embodiments of the present disclosure.

FIG. 3 is a diagram illustrating notification of swap activity, in accordance with some embodiments of the present disclosure. At step 1, first data (e.g., first content of a guest physical page) is moved/swapped from a location in the memory 106 to a location in the storage 104. In some embodiments, the first data is moved because second data is being stored in the memory 106 and there is no more memory available in the memory 106. At step 2, the swap notifier 116 detects that the first data has been swapped and exceeds a swapping activity threshold. In some embodiments, at step 3, the swap notifier 116 indicates to the event notifying service 114 that swap activity has been detected. Alternatively, the swap notifier 116 and the event notifying service 114 are a same component. At step 4, the event notifying service 114 indicates, to the user-space application 118 that the swapping activity exceeds the swapping activity threshold. In some embodiments, the user-space application 118 predefines the swapping activity threshold.

Advantageously, in some embodiments disclosed herein, the system software uses event-based notification instead of repeatedly scheduling and de-scheduling polling requests. Accordingly, the system may incur less CPU consumption and cache interference. Moreover, notification delays in order to improve resource consumption can be avoided. Thus, user applications may be notified of swapping activity sooner, giving the application more time to react to changes.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A non-transitory computer readable storage medium comprising instructions stored thereon that, when executed by a processor, cause the processor to:
   receive, from a user-space application, a request to detect swapping activity satisfying a threshold condition, wherein the swapping activity comprises swapping pages of a virtual machine (VM) from a host memory to a storage location shared by multiple VMs, wherein a page table of the VM specifies physical locations of non-swapped pages in the host memory and physical locations of swapped pages in the storage location;
   detect the swapping activity satisfying the threshold condition; and
   in response to occurrence of the threshold condition, send a response that indicates that the swapping activity satisfies the threshold condition.

2. The medium of claim 1, further comprising instructions stored thereon that, when executed by the processor, cause the processor to interpose on swap-out activity at a head of a swap-out path to detect the swapping activity.

3. The medium of claim 1, further comprising instructions stored thereon that, when executed by the processor, cause the processor to interpose on input/output (I/O) requests to storage to detect the swapping activity.

4. The medium of claim 1, wherein the user-space application issues a blocking system call.

5. The medium of claim 1, further comprising instructions stored thereon that, when executed by the processor, cause the processor to use one or more of sysfs_notify( ) or an eventfd mechanism to awaken a process of the user-space application.

6. The medium of claim 1, wherein the user-space application sets the threshold condition by at least one of writing to a sysfs node or issuing an ioctl( ) to a special file.

7. The medium of claim 1, wherein the threshold condition can include one or more of a raw swap count, a mean, a standard deviation, or a moving average.

8. An apparatus comprising a processor and a memory, wherein the memory includes programmed instructions that, when executed by the processor, cause the apparatus to:
   receive, from a user-space application, a request to detect swapping activity satisfying a threshold condition, wherein the swapping activity comprises swapping pages of a virtual machine (VM) from a host memory to a storage location shared by multiple VMs, wherein a page table of the VM specifies physical locations of non-swapped pages in the host memory and physical locations of swapped pages in the storage location;
   detect the swapping activity satisfying the threshold condition; and
   in response to occurrence of the threshold condition, send a response that indicates that the swapping activity satisfies the threshold condition.

9. The apparatus of claim 8, wherein the memory further includes programmed instructions that, when executed by the processor, cause the apparatus to interpose on swap-out activity at a head of a swap-out path to detect the swapping activity.

10. The apparatus of claim 8, wherein the memory further includes programmed instructions that, when executed by the processor, cause the apparatus to interpose on input/output (I/O) requests to storage to detect the swapping activity.

11. The apparatus of claim 8, wherein the user-space application issues a blocking system call.

12. The apparatus of claim 8, wherein the memory further includes programmed instructions that, when executed by the processor, cause the apparatus to use one or more of sysfs_notify( ) or an eventfd mechanism to awaken a process of the user-space application.

13. The apparatus of claim 8, wherein the user-space application sets the threshold condition by at least one of writing to a sysfs node or issuing an ioctl( ) to a special file.

14. The apparatus of claim 8, wherein the threshold condition can include one or more of a raw swap count, a mean, a standard deviation, or a moving average.

15. A computer-implemented method comprising:
 receiving, from a user-space application, a request to detect swapping activity satisfying a threshold condition, wherein the swapping activity comprises swapping pages of a virtual machine (VM) from a host memory to a storage location shared by multiple VMs, wherein a page table of the VM specifies physical locations of non-swapped pages in the host memory and physical locations of swapped pages in the storage location;
 detecting the swapping activity satisfying the threshold condition; and
 in response to occurrence of the threshold condition, sending a response that indicates that the swapping activity satisfies the threshold condition.

16. The method of claim 15, further comprising interposing on swap-out activity at a head of a swap-out path to detect the swapping activity.

17. The method of claim 15, further comprising interposing on input/output (I/O) requests to storage to detect the swapping activity.

18. The method of claim 15, wherein the user-space application issues a blocking system call.

19. The method of claim 15, further comprising awakening a process of the user-space application.

20. The method of claim 15, wherein the user-space application sets the threshold condition by at least one of writing to a sysfs node or issuing an ioctl( ) to a special file.

\* \* \* \* \*